(12) United States Patent
Luzzatti et al.

(10) Patent No.: US 8,645,561 B2
(45) Date of Patent: Feb. 4, 2014

(54) SYSTEM AND METHOD FOR REAL-TIME TRANSFER OF VIDEO CONTENT TO A DISTRIBUTION NODE OF A P2P NETWORK OVER AN INTERNET PROTOCOL NETWORK

(75) Inventors: Omer Luzzatti, Tel-Aviv (IL); Eran Weiss, Ramat Gan (IL); Shimon Kogan, Kiryat Ono (IL)

(73) Assignee: Ray-V Technologies, Ltd., Tel-Aviv (IL)

( * ) Notice: Subject to any disclaimer, the term of this patent is extended or adjusted under 35 U.S.C. 154(b) by 697 days.

(21) Appl. No.: 12/871,586

(22) Filed: Aug. 30, 2010

(65) Prior Publication Data

US 2012/0054361 A1 Mar. 1, 2012

(51) Int. Cl.
*G06F 15/16* (2006.01)
(52) U.S. Cl.
USPC ............................. 709/231; 709/230; 709/232
(58) Field of Classification Search
None
See application file for complete search history.

(56) References Cited

U.S. PATENT DOCUMENTS

| | | |
|---|---|---|
| 6,484,210 B1 | 11/2002 | Adriano et al. |
| 6,650,636 B1 | 11/2003 | Bradshaw et al. |
| 6,665,292 B1 | 12/2003 | Bradshaw et al. |
| 6,674,731 B1 | 1/2004 | Bradshaw et al. |
| 6,963,590 B1 | 11/2005 | Mann et al. |
| 7,194,757 B1 | 3/2007 | Fish et al. |
| 7,391,767 B2 | 6/2008 | Lee et al. |
| 7,650,620 B2 | 1/2010 | Fish et al. |
| 8,040,811 B2 * | 10/2011 | Edwards et al. ............... 370/241 |
| 2008/0049625 A1 * | 2/2008 | Edwards et al. ............... 370/241 |
| 2008/0160911 A1 | 7/2008 | Chou et al. |
| 2009/0132649 A1 * | 5/2009 | Hubbard ........................ 709/203 |
| 2009/0165068 A1 | 6/2009 | Chang et al. |
| 2010/0246469 A1 * | 9/2010 | Gheorghiu et al. ........... 370/312 |

* cited by examiner

*Primary Examiner* — Umar Cheema
(74) *Attorney, Agent, or Firm* — Myers Wolin, LLC

(57) ABSTRACT

A method for broadcasting time sensitive content over an Internet protocol (IP) network for distribution in a peer-to-peer (P2P) network. The method comprises segmenting the time sensitive content into a plurality of segments; separating each segment of the plurality of segments into a plurality vectors; generating random linear combination equations respective of the plurality of vectors; interleaving equations of at least two different segments of the plurality of segments; and transmitting at least a portion of the equations over the IP network to at least one distribution node for the distribution of the time sensitive content in the P2P network, wherein the time sensitive content is recreated from the equations at least the distribution node.

19 Claims, 3 Drawing Sheets

SYSTEM AND METHOD FOR REAL-TIME TRANSFER OF VIDEO CONTENT TO A DISTRIBUTION NODE OF A P2P NETWORK OVER AN INTERNET PROTOCOL NETWORK

TECHNICAL FIELD

The present invention relates generally to video content broadcast, and more particularly to a system and method to enable high quality broadcast from a central broadcaster over the Internet protocol (IP).

BACKGROUND OF THE INVENTION

Peer-to-peer (P2P) for delivery of content between the peers of a network is now common place. As an example, P2P file sharing systems are well known in the industry and use a very efficient technology to deliver media. Examples for such P2P systems are BitTorrent® and Gnutella. These systems do not distribute the content in real-time, rather, a user can download the content (files) and view it only when the download has completed, i.e., a user cannot view the file (e.g., a movie) while downloading it. New P2P networks enable real-time streaming content over P2P networks. PCT application number PCT/IL2007/000392 entitled "Realtime Media Distribution in a P2P Network", by Omer Luzzatti, et al (hereinafter "Luzzatti"), assigned to common assignee and incorporated herein by reference, discloses an exemplary real-time P2P network where nodes in the network can act in the role of 'amplifiers' to increase the total available bandwidth made available in the network, thus improving the quality of the media consumed by the viewers.

Providers of real-time streaming content, e.g., video broadcasters, also referred to sometimes as encoders, need to deliver significant amounts of video content to certain remote nodes. Such nodes are generally located at a multiple system operator (MSO) or Telco head-end, and then from these nodes to the viewers via various technologies. Such content delivery is typically done by the use of satellites positioned in outer space, where the broadcaster transmits the streaming content to one or more such satellites in space which then retransmit such streaming content to ground stations for delivery into certain nodes. While certainly known to be operative the problem is that such transmission has a high cost. On the other hand, the broadcaster cannot connect directly for broadcasting to the local, last mile network, over an Internet protocol (IP) network. The IP network does not guarantee the transfer of all the packets and loss of such packets is detrimental to real-time delivery of video content. Further, interferences impacting the broadcast are not distributed in a statically even distribution as far as each packet over the Internet is concerned, therefore certain streaming content may be impacted more significantly than other streaming content.

It would be therefore advantageous to provide a solution that would enable the broadcast of streaming content having real-time sensitivities, such as video content, over the IP network to eliminate the need to use space-based satellite communication in the process of broadcasting such streaming content to the nodes of the P2P network. Furthermore, it would further advantageous to provide a solution that would enable reliable transfer of such streaming content over an unreliable transmission link under certain time constraints via various different paths, e.g., different Internet service providers (ISPs) and then reliably recollection at the node.

SUMMARY OF THE INVENTION

Certain embodiments of the invention include a method for broadcasting time sensitive content over an Internet protocol (IP) network for distribution in a peer-to-peer (P2P) network. The method comprises segmenting the time sensitive content into a plurality of segments; separating each segment of the plurality of segments into a plurality vectors; generating random linear combination equations respective of the plurality of vectors; interleaving equations of at least two different segments of the plurality of segments; and transmitting at least a portion of the equations over the IP network to at least one distribution node for the distribution of the time sensitive content in the P2P network, wherein the time sensitive content is recreated from the equations at least the distribution node.

Certain embodiments of the invention further include a system for broadcasting time sensitive content over an Internet protocol (IP) network for a peer-to-peer (P2P) network. The P2P network comprises a storage containing at least time sensitive content for the delivery to nodes of the P2P network; at least one distribution node connected to the IP network; and a broadcasting unit connected to the storage and to the at least one distribution node for retrieving the time sensitive content from the storage and transmitting the content to the at least one distribution node as a plurality of random linear combination equations derived from segments of the time sensitive content wherein at least a portion of the equations are transmitted to the at least one distribution node, enabling the recreation of the time sensitive content from the equations available at the at least one distribution node.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
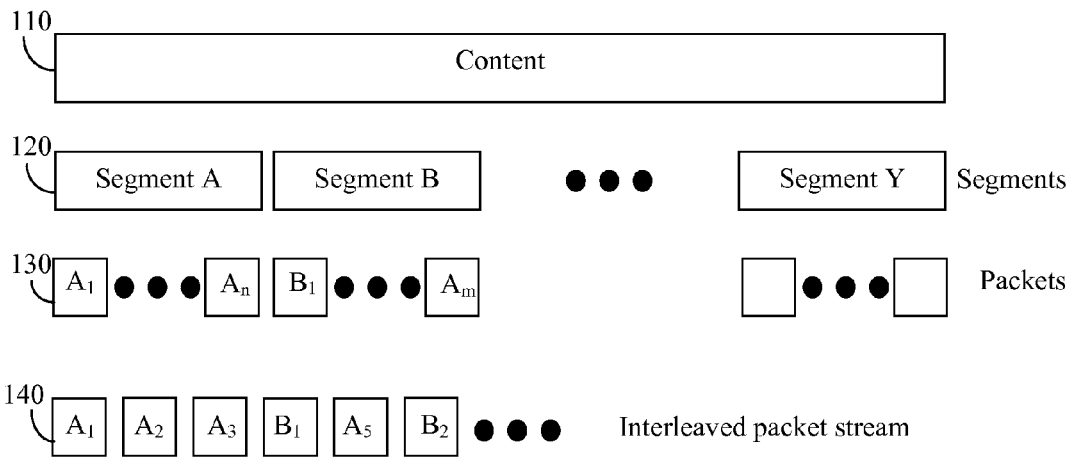
FIG. 1 is a diagram illustrating the separation and interleaving of the streaming content according to the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments of the invention allow to achieve high quality of service (QoS) while sending the time sensitive content over an Internet protocol (IP) network, when distributing the content to nodes of a peer-to-peer (P2P) network, and by the use of certain interleaving of video segments and sending data equations thereof. Distribution costs are therefore significantly reduced without suffering from delivery degradation.

Figure 4:
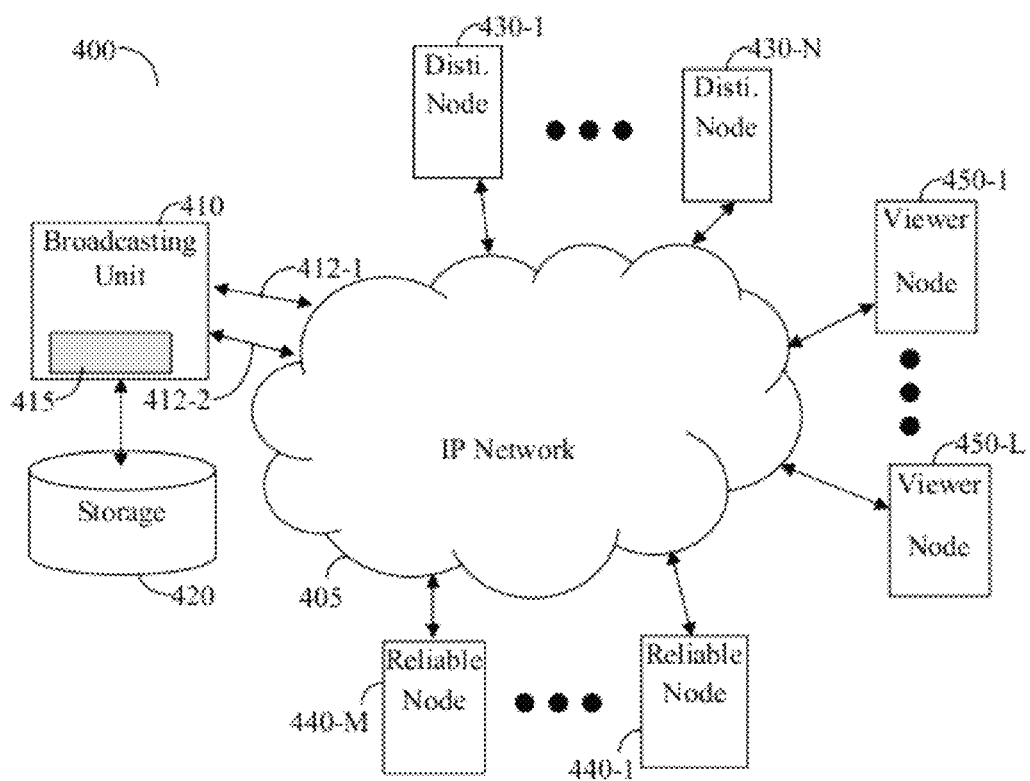
FIG. 4 is a system for reliable real-time transfer of streaming content over IP according to an embodiment of the invention.

In accordance with an embodiment of the invention, a system on the broadcaster's side, described in more detail herein below with reference to FIG. 4, is responsible for separating the streaming content into segments, each segment being of a relatively short time. The duration of a segment is a configurable parameter of the system and may be tuned either statically or dynamically with measurements of, for example, current QoS of the network versus the desired QoS of the network, bandwidth, and so on. Implementing of such measurements is generally known in the art and is outside the scope of the invention. In an exemplary embodiment of the invention, the duration parameter of a segment is set to half a second. It should be noted that the duration of time set for each segment is substantially equal to other segments. For example, the system may allow up to 5% deviation in the time duration of different segments.

The separation of content 110 into segments 120 is shown in the exemplary and non-limiting FIG. 1. Each segment is then separated into packets 130 that fit the Internet protocol. The separation and actual creation of such packets in 130 is explained in greater detail herein below. However, it is necessary to ensure, according to the principles of the invention, that the elements in the network that transmit such packets will not attempt to break such packets into smaller packets, as often may happen with larger packets in accordance with the IP principles of operation. This may cause, in the case of a loss of a packet the requirement to resend the entire large packet originally sent by the source. Therefore, the packet is always smaller than a maximum transmission unit (MTU) that is supported by all the routers. The size of a packet is a configurable parameter that may be determined by the system and applied according to MTU supported by all routers in the network. In exemplary embodiment, the typical size of a packet 130 is 1500 Bytes.

The system on the broadcaster side can now start streaming the packets 130 as will further be discussed herein below. However, as noted earlier, streaming of the data in regular order may impact a specific segment 120, for example segment B, more than it would impact another segment, for example segment A. This is because the interference occurs, time wise, at a certain time that may impact only the packets of segment B, and hence recovery of segment B would be more difficult and more demanding if at all possible. For example, typical packet loss over IP networks occurs in a sequence of packets, namely, a 2% packet loss usually indicates a particular time with significant packet loss rather than a well-distributed loss over time. Therefore, interleaving of the packets 130 is performed by the system such that an interleaved packet stream 140 is generated. Initially, a plurality of packets 130 from segment A are sent, but then interleaving with other packets 130 from another segment take place. For example, after the first three packets of segment A, $A_1$, $A_2$, and $A_3$, interleaving with packets of segment B may take place resulting with a sequence of $A_4$, $B_1$, $A_5$, $B_2$, $A_6$, and $B_3$, and then beginning to interleave packets from segment C, for example, $A_7$, $B_4$, $C_1$, $A_8$, $B_5$, and $C_2$, and so on and so forth. The depth of the interleaving is a configurable parameter of the system, allowing different proportions between packets of an earlier segment and a later segment, for example, giving a higher priority for transmission of earlier packets when interleaving with packets from a later segment, and so on. The deeper the interleaving, i.e., more packets from different segments are interleaved, the deeper the packet delay, and such depth has to be balanced by the system to ensure, for example, the desired QoS. However, when at a certain time certain packets are impacted as a result of an interference of any sort, the impact on any specific segment is reduced and it is relatively easy to overcome such problem by immediate retransmission of the missing packets.

The description above generally related to segment A as broken to different packets. In another embodiment of the invention, packets of a certain segment (e.g., 'n' packets $A_1$ to $A_n$ of segment A) would be able to reconstruct their respective segment (e.g., segment A) and by doing so to further reduce the impact of a specific loss. Therefore, an operation is performed by the system prior to streaming. This operation combines the step of taking each of the segments and dividing them into vectors and then performing on a group of vectors a random linear combination. The result of this operation is sent over the IP network. Performing this operation, and given that an ample amount of such equations are transmitted over the network, makes it possible to reconstruct the interleaved packet stream without a need for a retransmission of the exact same packets, once the linear combinations are received by the distribution nodes, and as described in more detail herein below.

Figure 2:
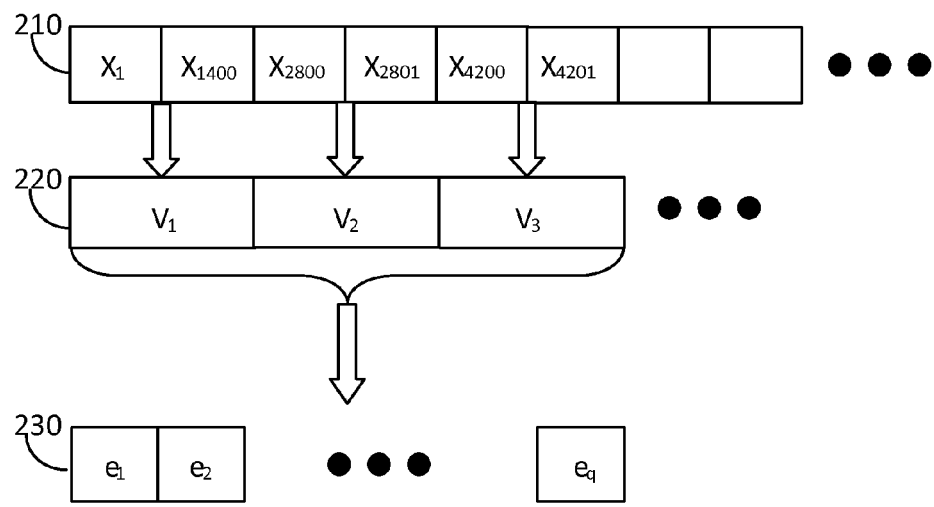
FIG. 2 is a diagram illustrating the generation of linear combinations of vectors from the interleaved packets according to the principles of the invention.

The exemplary and non-limiting FIG. 2, shows a diagram for the generation of linear combinations of vectors from the segments according to the principles of the invention. A segment 210, for example, comprises of a plurality of bytes $X_1$, $X_2$, through $X_k$ that can be grouped into vectors 220. For example, $X_1$ and $X_{1400}$ comprise a vector $V_1$, $X_{1401}$ and $X_{2800}$ comprise a vector $V_2$, and so on and so forth. According to an embodiment of the invention, a plurality of such vectors V are used to generate the random linear equations therefrom. For example, using $V_1$, $V_2$, and $V_n$, a plurality of equations 230 $e_1$, $e_2$, ... $e_q$, may be generated as follows:

$$e_i = \alpha_{1,i} V_1 + \alpha_{2,i} V_2 + \alpha_{3,i} V_3 + \ldots + \alpha_{n,i} V_n$$

where i=1, 2 ..., q and where the '$\alpha$' values may be '0' or '1' or any other number from a mathematical field, where each '$\alpha$' value is randomly selected. The multiplications and the sums are typically over a field, for example, a field of $2^8$ (Galois field). Given an ample number 'q' of equations 'e' a matrix is available that in most cases, allow the generation of the original segment. In an embodiment of the invention, an ample number of equations is when the number (q) of equations 'e' is greater than or equal to the number of vectors (n) of a respective segment, i.e., q>=n. It should be noted that if it not possible to reconstruct the segment using the initial number of generated equations, then one or more equations 'e' can be added to solve the matrix. It should be further noted that while the discussion above each vector is described as a byte of segment it is possible to use multiple bytes or even multiple segment $A_i$ to create a vector V, without departing from the teachings herein. The advantage of this process over traditional error correction is that it is adjustable to the specific needs of the network. For example, if the network suffers from a lower reliability more equations 'e' can be generated while fewer are necessary in more reliable transmission environments. The fact that the error correction scheme is not hardcoded, for example, adding an error correction byte to a number of bytes, or the likes, enables a flexible error correction scheme that is adjusted to the specific needs of a network, which may further change over time. In one embodiment of the invention, a distribution node may request additional equations 'e' once crossing a time threshold where the received number of equations does not enable a solution for extraction of the interleaved packet stream.

It should be appreciated that the method described above also enables a more efficient transmission when the nodes at the head-end fetch the data from more than one source simultaneously. Namely when more than one distributing node sends the data to the receiving node. Each of the nodes in path receives some of the information and equations would enable to solve the matrix and to deduce the original segment.

Figure 3:
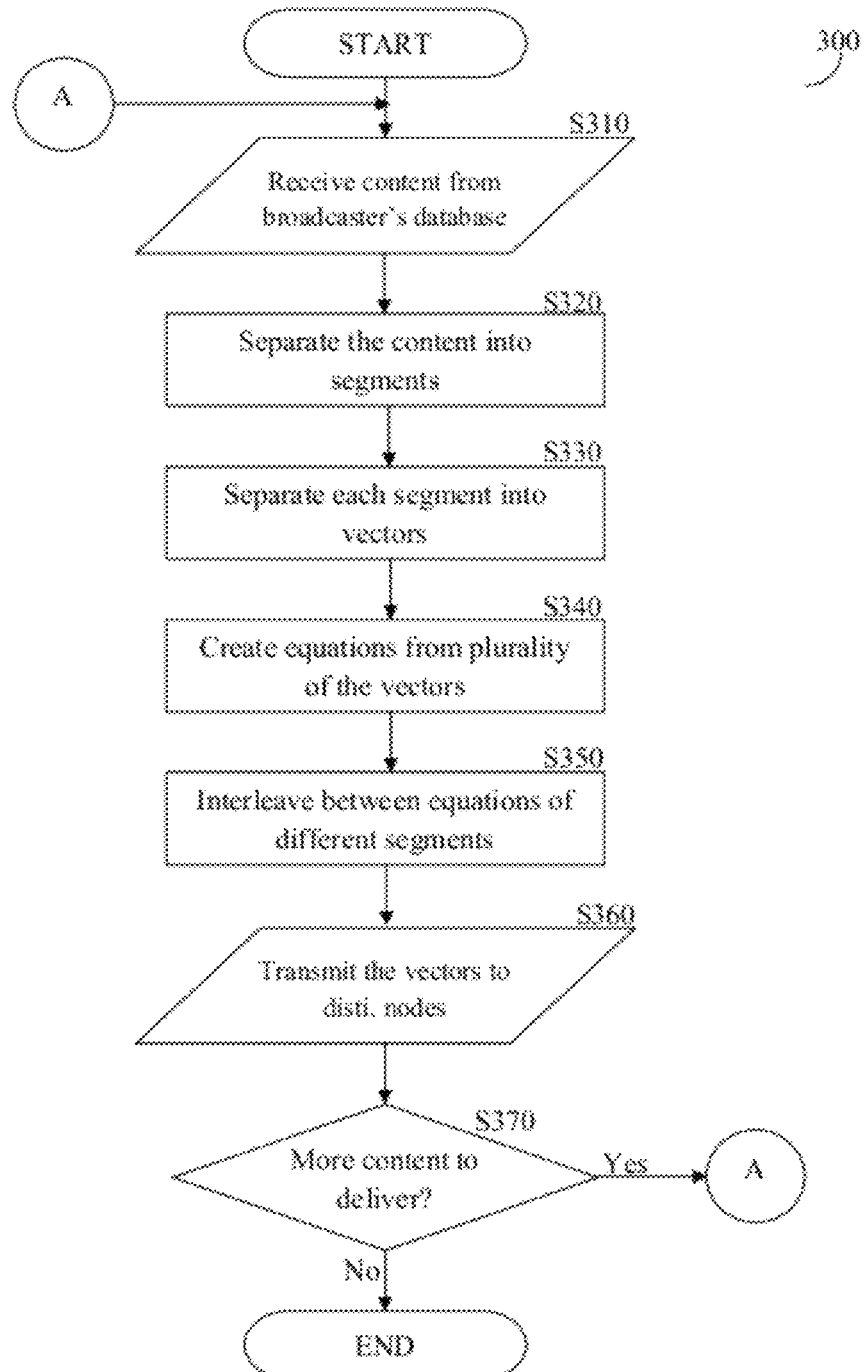
FIG. 3 is a flowchart describing the generation of the packet stream from a broadcasting node to a distribution node according to an embodiment of the invention.

FIG. 3 shows an exemplary and non-limiting flowchart 300 depicts the generation of the packet stream from the broadcasting node to the distribution node. In S310, time sensitive content, such as video content, is received by the system from a broadcaster. In S320, the content is segmented into a plurality of segments of generally equal size, typically half a second each, when video is concerned. The size of each segment may be a parameter of the system and further depends and may be dynamically configured to ensure, for example, QoS of the network. In S330, each segment is further separated into vectors, each vector having a size equal to or smaller than the MTU of the routers in the IP network. This size of a vector is set by configurable parameter which may be adjustable based on changes in the network, such as the available bandwidth, packet drop rate, and others. In S340, there are generated a plurality of equations of a random combination of a plurality of vectors, wherein a binary coefficient having a value of a coefficient from a field multiplies the respective vector value. An ample number of equations are generated to enable the reconstruction of the interleaved packet stream at a distribution node as explained with reference to FIG. 2. In S350, interleaving between the equations of different segments is performed as explained in more detail hereinabove with respect of FIG. 1. In S360, the equations are transmitted over an IP network using one or more ISPs to one or more distribution nodes. In S370, it is checked whether additional content is to be distributed, and if so execution continues with S310; otherwise, execution ends.

FIG. 4 depicts an exemplary and non-limiting system 400 for reliable real-time transfer of streaming content over an IP network according to an embodiment of the invention. The system 400 comprises a broadcasting unit 410 that is fitted with a control unit 415 and a storage 420 that contains the streaming content to be broadcast. The broadcasting unit 410 is connected to an IP network 405 by one or preferably more ISPs, allowing for both redundancy and bandwidth, and avoiding a single point of failure.

The control unit 415 generates for the broadcasting unit 410 the equations described hereinabove. Specifically, the process performed by the control unit 415 includes interleaving of packets between segments of the streaming content and the generating of the equations respective of vectors that are extracted from the interleaved streaming packets. The control unit 415 further initiates for the transmission of the equations to distribution nodes 430-1 through 430-N (collectively referred to as distribution nodes 430) that are also coupled to the IP network 405. It should be noted that it is not necessary to send the entire stream to each of the distribution nodes 430. For example, if there are three such distribution nodes 430, and each receives only two thirds of the stream, even if one of them fails, the stream can still be fully reconstructed from the content in the two operative distribution nodes 430. The content sent to the distribution nodes 430 is balanced between them by the control unit 415.

Also connected to the IP network 405 are reliable nodes 440-1 through 440-M (collectively referred to as reliable nodes 440) that receive either the interleaved streaming packets or the equations from one or more of the distribution nodes 430. The function of reliable nodes in a P2P network is discussed in more detail in co-pending U.S. patent application Ser. No. 12/473,006, "Method for Buffering Management for Video Swarms in a Peer-to-Peer Network", assigned to common assignee and incorporated herein by reference for all that it contains.

To the IP network 405 there are further coupled a plurality of viewer nodes 450-1 and 450-L that complete the P2P network. Thus, the P2P network includes the nodes 430, 440 and 450 all communicate through the IP network 405. The entire P2P network may be now used to send and receive reliably the streaming content from the broadcasting unit 410 through the distribution nodes 430 to be constructed by viewer and reliable nodes 440 and 450. Further, segments of the video content can be reconstructed by the distribution nodes 430.

In the system 400, the equations generated in the broadcasting unit 410 by the control unit 415 are sent to the distribution units 430 and from there to the reliable nodes 440 of the P2P network. However, it should be noted that the distribution nodes 430 may be communicating directly with viewer nodes 450 without departing from the scope of the invention. It should be noted that according to one embodiment of the invention, a distribution node 430 may receive data from another distribution node 430, without having to interact with a reliable node 440. Moreover, a hierarchy of distribution nodes is also possible that may be as deep as required and without departing from the scope of the invention.

It should be appreciated that teachings described herein overcome the need for the use of space-based satellites for the purpose of distribution streaming content to distribution nodes.

The principles of the invention may be implemented in hardware, firmware, software or any combination thereof. Moreover, the software is preferably implemented as an application program tangibly embodied on a program storage unit or non-transitory computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A method for broadcasting time sensitive content over an Internet protocol (IP) network for distribution in a peer-to-peer (P2P) network, comprising:
   segmenting the time sensitive content into a plurality of video segments, wherein each of the plurality of video segments is comprised of a plurality of bytes;
   separating each video segment of the plurality of video segments into a plurality of vectors, wherein each vector of the plurality of vectors is comprised of at least one byte of a video segment;

generating random linear combination equations for each video segment by performing a random linear combination on a group of vectors of a respective video segment;

interleaving equations of at least two different video segments of the plurality of video segments; and transmitting at least a portion of the equations over the IP network to at least one distribution node for the distribution of the time sensitive content in the P2P network, wherein the time sensitive content is recreated from the equations of at least the distribution node.

2. The method of claim 1, further comprising: sending the at least portion of the plurality of equations from an early video segment of the plurality of video segments prior to interleaving the equations of subsequent segments of the plurality of segments.

3. The method of claim 2, wherein interleaving of the equations from the at least two different video segments of the plurality of video segments is weighted such that equations of an earlier video segment have a higher weight than equations of a later video segment.

4. The method of claim 1, wherein duration of time set for each video segment is substantially equal to other video segments and is determined by a configurable parameter.

5. The method of claim 1, further comprising: generation of an initial number of equations which is no less than the number of vectors of respective video segments; and adjusting the number of equations generated according to the network conditions.

6. The method of claim 1, further comprising: requesting additional equations for the recreation of the at least video segment of the time sensitive content when it is determined that the at least video segment cannot be created from the equations currently available.

7. The method of claim 6, wherein the additional equations are requested from at least a reliable node of the P2P network.

8. The method of claim 1, wherein a first distribution node of the at least one distribution node distributes at least a portion of the equations received by the first distribution node to a second distribution node of the at least one distribution node.

9. The method of claim 1, wherein a size of each of the plurality of vectors is no greater than a size of a maximum transmission unit (MTU) set for routers in the IP network.

10. A non-transitory computer readable medium having stored thereon instructions for causing one or more processing units to execute the method according to claim 1.

11. A system for broadcasting time sensitive content over an Internet protocol (IP) network for a peer-to-peer (P2P) network, comprising:

a storage containing at least time sensitive content for the delivery to nodes of the P2P network;

at least one distribution node connected to the IP network; and a broadcasting unit connected to the storage and to the at least one distribution node for retrieving the time sensitive content from the storage and transmitting the time sensitive content to the at least one distribution node as a plurality of random linear combination equations derived from video segments of the time sensitive content wherein at least a portion of the equations are transmitted to the at least one distribution node, enabling the recreation of the time sensitive content from the equations available at the at least one distribution node, wherein the video segments of the time sensitive content are comprised of a plurality of bytes and each video segment is separated into a plurality of vectors, wherein each vector of the plurality of vectors is comprised of at least bytes of a video segment and the plurality of random linear combination equations is derived by performing a random linear combination on a group of vectors of each video segment.

12. The system of claim 11, further comprising at least a reliable node connected to the IP network for the purpose of supplying additional equations if it is determined that reconstruction of a segment of the time sensitive content is not possible from the currently available equations.

13. The system of claim 11, wherein the equations of one video segment of the video segments of the time sensitive content are interleaved with the equations of at least another segment of the time sensitive content.

14. The system of claim 13, wherein the at least portion of the plurality of equations from an early video segment of the plurality of video segments is sent prior to interleaving with equations of subsequent segments of the plurality of segments.

15. The system of claim 13, wherein interleaving the equations from different video segments of the plurality of segments is weighted such that equations of an earlier video segment have a higher weight than equations of a later segment.

16. The system of claim 11, wherein duration of time set for each segment is substantially equal to other segments and determined by a configurable parameter.

17. The system of claim 11, wherein the initial number of generated equations is no less than the number of vectors of a respective video segments and the number of equations generated is adjusted according to the network conditions.

18. The system of claim 11, wherein a first distribution node of the at least one distribution node distributes at least a portion of the equations received by the first distribution node to a second distribution node of the at least one distribution node.

19. The system of claim 11, wherein a size of each of the plurality of vectors is no greater than a size of a maximum transmission unit (MTU) set for routers in the IP network.

* * * * *